United States Patent
Ward, III et al.

[11] 3,779,214
[45] Dec. 18, 1973

[54] ROTARY COMBUSTION ENGINE HAVING A CHARGE-COOLED ROTOR AND SIDE AND PERIPHERAL WALL INTAKE PORTS

[75] Inventors: Harry M. Ward, III, Waukegan, Ill.; Eugene R. Hackbarth, Kenosha, Wis.

[73] Assignee: Outboard Marine Corporation, Waukegan, Ill.

[22] Filed: Oct. 13, 1972

[21] Appl. No.: 297,254

[52] U.S. Cl. ............................... 123/8.01, 418/86
[51] Int. Cl. ............................................. F02b 55/06
[58] Field of Search ......................... 123/8.01, 8.45; 418/61, 86

[56] References Cited
UNITED STATES PATENTS
3,424,135   1/1969   Tado................................. 418/86 X
3,373,722   3/1968   Zimmermann et al. .......... 418/86 X FOREIGN PATENTS OR APPLICATIONS
1,186,460   4/1970   Great Britain....................... 418/86

Primary Examiner—Carlton R. Croyle
Assistant Examiner—Michael Koczo, Jr.
Attorney—Arthur Frederick et al.

[57] ABSTRACT

In a rotary internal combustion engine, having a charge-cooled rotor and intake ports in a housing side wall and housing peripheral wall, the intake ports are in communication with the rotor to receive all of the fuel-air mixture after it has flowed through the rotor. The flow through the intake port in the side wall is controlled by the rotor in its rotation within the housing while the flow through the intake port in the peripheral wall is throttled by a valve actuated in response to the speed or load of the engine so that, simultaneously with efficient cooling of the rotor, the engine derives the benefit of side intake and peripheral intake ports for smooth engine performance from idle to full speed.

10 Claims, 5 Drawing Figures

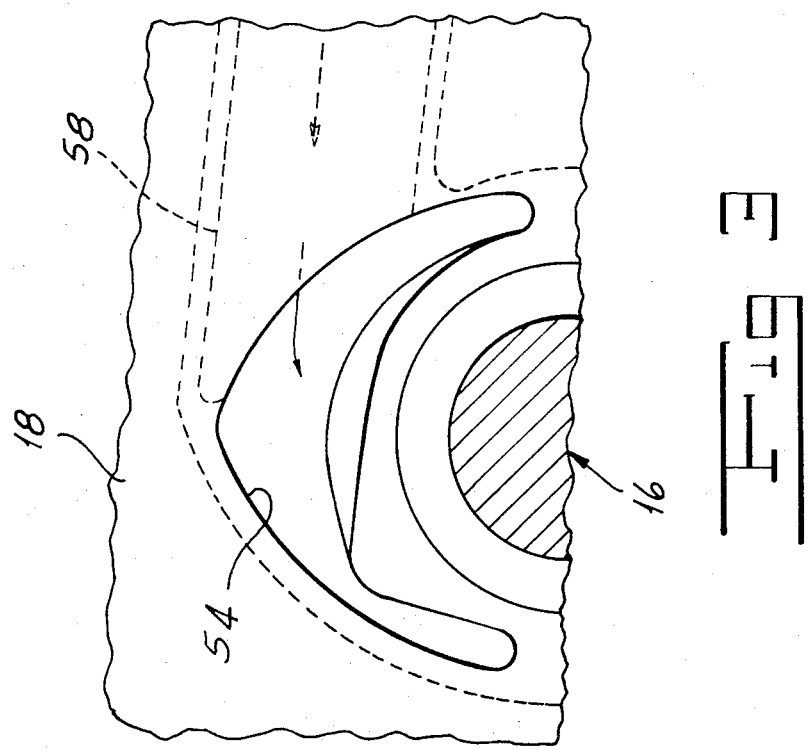

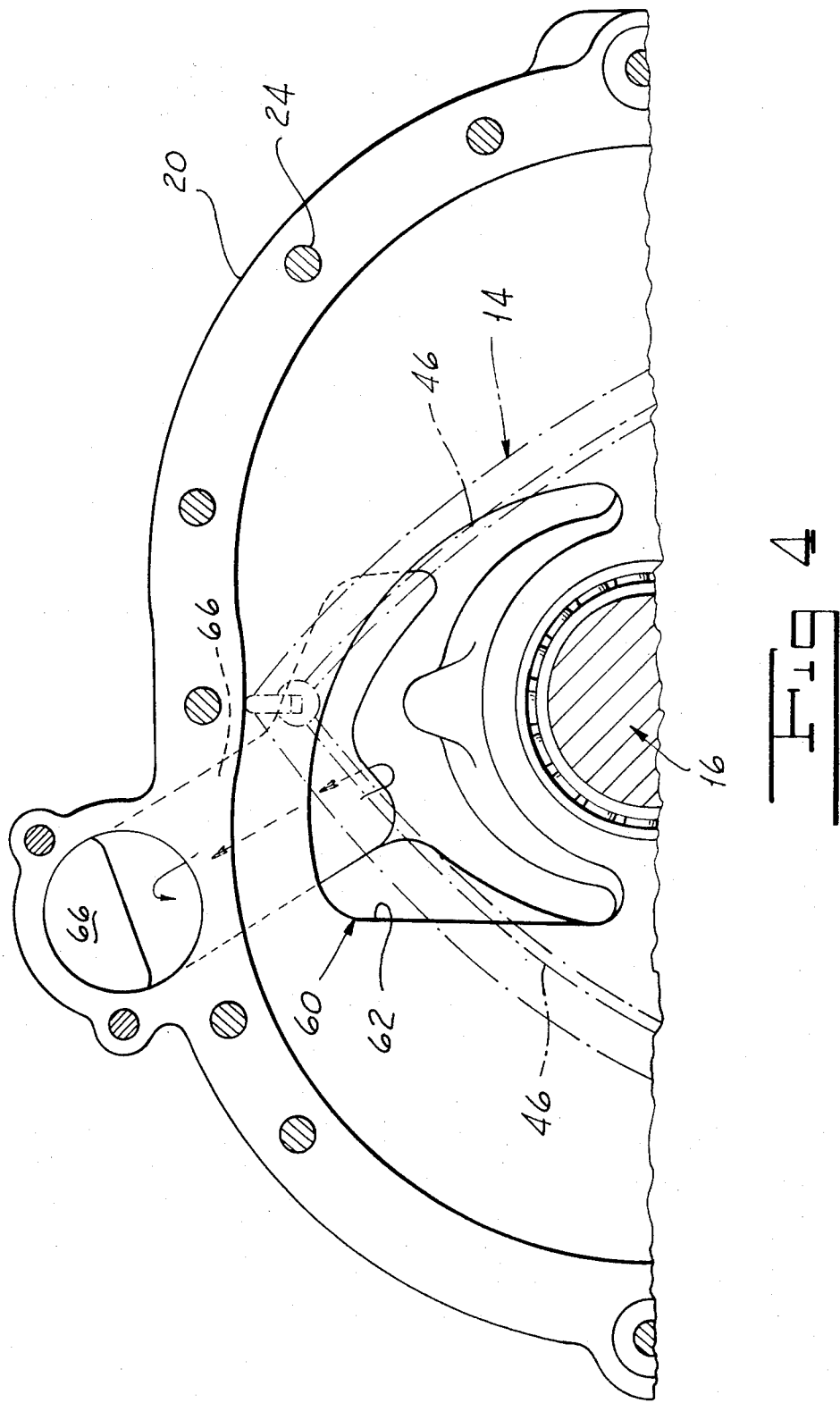

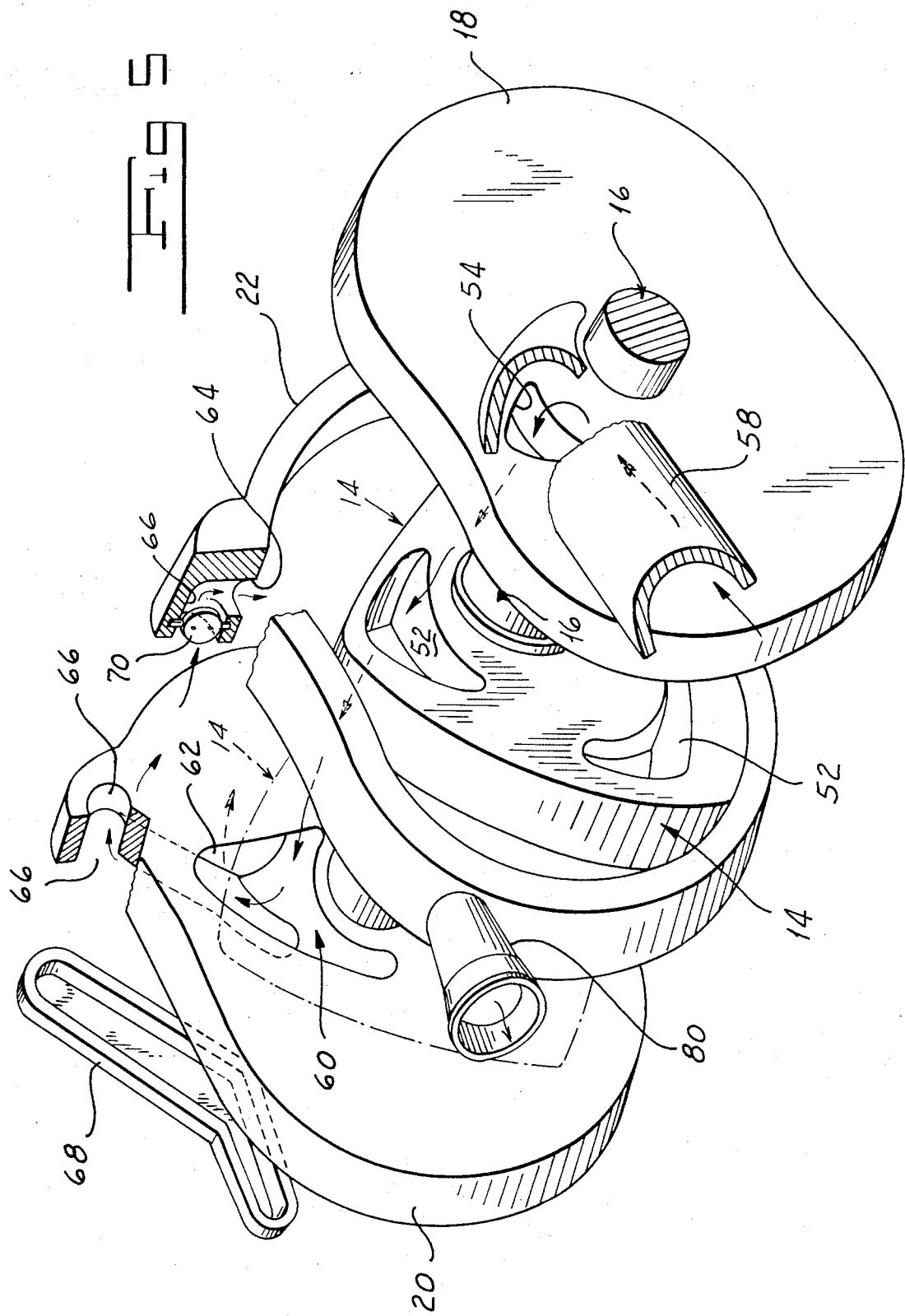

ROTARY COMBUSTION ENGINE HAVING A CHARGE-COOLED ROTOR AND SIDE AND PERIPHERAL WALL INTAKE PORTS

DISCLOSURE OF THE INVENTION

This invention relates to rotary combustion engines, and more particularly to an improvement in rotary internal combustion engines of the charge-cooled rotor type.

BACKGROUND OF THE INVENTION

In rotary internal combustion engines of the Wankel type, such as disclosed in U.S. Pat. No. 2,988,065 to Wankel et at., the cooling of the rotor has been achieved by the circulation of lubricant through the rotor, as exemplified in the U.S. Pats. to Bentele, No. 3,176,915 and Sollinger, No. 3,176,916, or by the flow of at least some of the fuel-air mixture through the rotor, the latter being referred to as a "charge-cooled" rotor. Charge-cooled rotors have been employed in combination with side and/or peripheral intake ports through which the fuel-air mixture enters the combustion chambers of the engine. Engines in which all of the fuel-air mixture required for combustion is flowed through the charge-cooled rotor and thence through a side intake port or ports are exemplified in the U.S. Pats. to Paschke, No. 3,180,323, Zimmerman et al., No. 3,373,722, and No. 3,405,694 and Keller et al., No. 3,652,190. Engines in which the total fuel-air mixture is divided so that a portion or all of the fuel-air mixture is caused to flow through the charge-cooled rotor and a portion through a side intake port and peripheral intake port is disclosed in the U.S. Pat. to Tado, No. 3,424,135 and the printed paper of the Society of Automotive Engineers entitled, Improvements of the Rotary Engine With a Charge-Cooled Rotor, prepared by Yamaoka and Tado, U.S. Pat. No. 720,466 and presented in May, 1972.

As is fully explained in the U.S. Pats. to Hamada, No. 3,424,136 and Froede, No. 3,244,153, an inherent characteristic of the rotary combustion engine of the Wankel type is that the employment of intake ports of large flow area in the side or peripheral walls of the engine casing or housing produces unstable operation, including sometimes misfiring, during the idling or low-load phases of operation of the engine, and provides high volumetric efficiency and correspondingly high performance during high speed operation of the engine with full-open throttle. This operating characteristic results from the overlapping of induction and exhaust cycles, particularly when both the intake and exhaust ports are located in the peripheral housing wall. This partial overlap has little significance when the engine is operating under heavy load, but results, at partial loads at low speed, in the transfer of some exhaust gas to the induction portion of the cycle of operation, mixing with the fresh gas and reducing the amount of fresh fuel and air which can be drawn into the combustion chambers. Thus, an intake port in the housing side wall provides good idling or partial load engine operation since the dilution of the fuel charge is minimal but results in loss of power at high speed because the geometry of the rotor limits the port size and the duration that it is open. Conversely, a peripheral intake port is not restricted in size by the rotor geometry and, therefore, provides for superior engine performance at high engine speed.

In the engines having charge-cooled rotors and intake ports located both in the peripheral and the side housing walls, such as disclosed in the aforesaid patent to Tado, U.S. Pat. No. 3,424,135 and the aforesaid Yamaoka et al S.A.E. paper, cooling efficiency of the rotor is diminished when all of the fuel-air mixture is not utilized to cool the rotor by reason of the fact that part of the fuel-air mixture bypasses the rotor and enters directly into the induction combustion chamber. In fact when the rotor cooling requirements increase with engine speed, the cooling charge flow undesirably decreases as more of the fuel-air mixture is delivered to the peripheral intake port.

It is therefore an object of this invention to provide an improved rotary internal combustion engine, having a charged-cooled rotor, in which maximum rotor cooling effect is achieved during all phases of engine operation and at the same time provides stable and efficient engine operation from idle and partial load conditions through high load, high speed operation.

It is another object of the present invention to provide, in a rotary internal combustion engine, a charge-cooled rotor capable of passing a fuel-air mixture to a side intake port and a peripheral intake port.

A further object of the present invention is to provide a rotary internal combustion engine with a charge-cooled rotor and wherein all of the fuel-air mixture is passed through the rotor and thence distributed between side and peripheral intake ports.

SUMMARY OF THE INVENTION

In view of the foregoing, this invention contemplates a rotary internal combustion engine which combines a charge-cooled rotor with the advantages of intake ports in the side and peripheral walls of the housing so that improved rotor cooling is achieved together with providing smooth, maximum engine performance during idle and partial load operating conditions up to and including high load, high speed operation.

The combination comprises a casing or housing having opposite side wall portions spaced apart by a peripheral wall to define therebetween a cavity and within which a rotor is supported for eccentric rotation. The inner surface of the peripheral wall has a trochoidal configuration with two or more lobes, while the rotor has a plurality of flank portions which number one more than the number of lobes. The rotor flank portions define with the trochoidal inner surface of the peripheral wall, a plurality of working chambers which progressively increase and decrease in volumetric size as the rotor rotates within the cavity and thereby each working chamber undergoes successively suction, compression, expansion and exhaust cycles of operation. A fuel-air mixture supply port is provided in one of the housing side walls and is connected through a suction conduit to a source of fuel and air, such as a carburetor. The rotor is provided with a plurality of axially extending cooling passageways which are so located and sized that, as the rotor rotates, the cooling passageways communicate with the supply port. A combined transition and intake port is provided in the side wall opposite from the supply port and such transition-intake port is so shaped and sized that it communicates with the rotor cooling passageways to receive the fuel-air mixture from the latter. A peripheral intake port is provided in the peripheral housing wall and is in communication with the transition-intake port, via a distribution passageway, to receive a portion of the fuel-air mixture delivered to the transition-intake port. The transition-intake port is located and sized so that a portion of the port is always located radially inwardly of the inner envelope curve (path of travel) scribed by the gas seals carried in the end faces of the rotor and a portion is always located radially outwardly of the inner envelope curve scribed by the gas seals. The former portion forms the transition port to receive the fuel-air mixture from the cooling passageways of the rotor while the latter port portion constitutes the intake port to pass all or a portion of the fuel-air mixture from the transition port portion to the working chamber under suction, hereinafter referred to as the "induction chamber."

A valve means is provided to control flow of fuel-air mixture through the peripheral intake port so that, during the idling phase of engine operation, the peripheral intake port can be closed and the engine operates only on the fuel-air mixture delivered to the induction chambers via the side intake port. Means may be provided for automatically opening the valve means as engine speed increases from idle so that at a predetermined engine speed or load full flow of fuel-air mixture is provided through the peripheral intake port while maintaining fuel-air flow through the side intake port portion into the induction chamber. Such means may be a linkage for interconnecting the valve means with the throttle valve linkage so that actuation of the throttle valve linkage simultaneously effects actuation of the valve means.

BRIEF DESCRIPTION OF THE DRAWINGS

The above and other objectives and advantages of the present invention will appear more fully hereinafter from a consideration of the detailed description which follows when taken together with the accompanying drawings wherein one embodiment of the invention is illustrated and, in which:

FIG. 3 is an enlarged fragmentary view in elevation showing the fuel-air mixture supply port shown in phantom lines in FIG. 2;

FIG. 4 is a fragmentary cross-sectional view taken substantially along line 4—4 of FIG. 1; and FIG. 5 is an exploded view in perspective of the rotary internal combustion engine of this invention in which the major components and parts are schematically shown.

DESCRIPTION OF THE PREFERRED EMBODIMENT OF THE INVENTION

Figure 1:
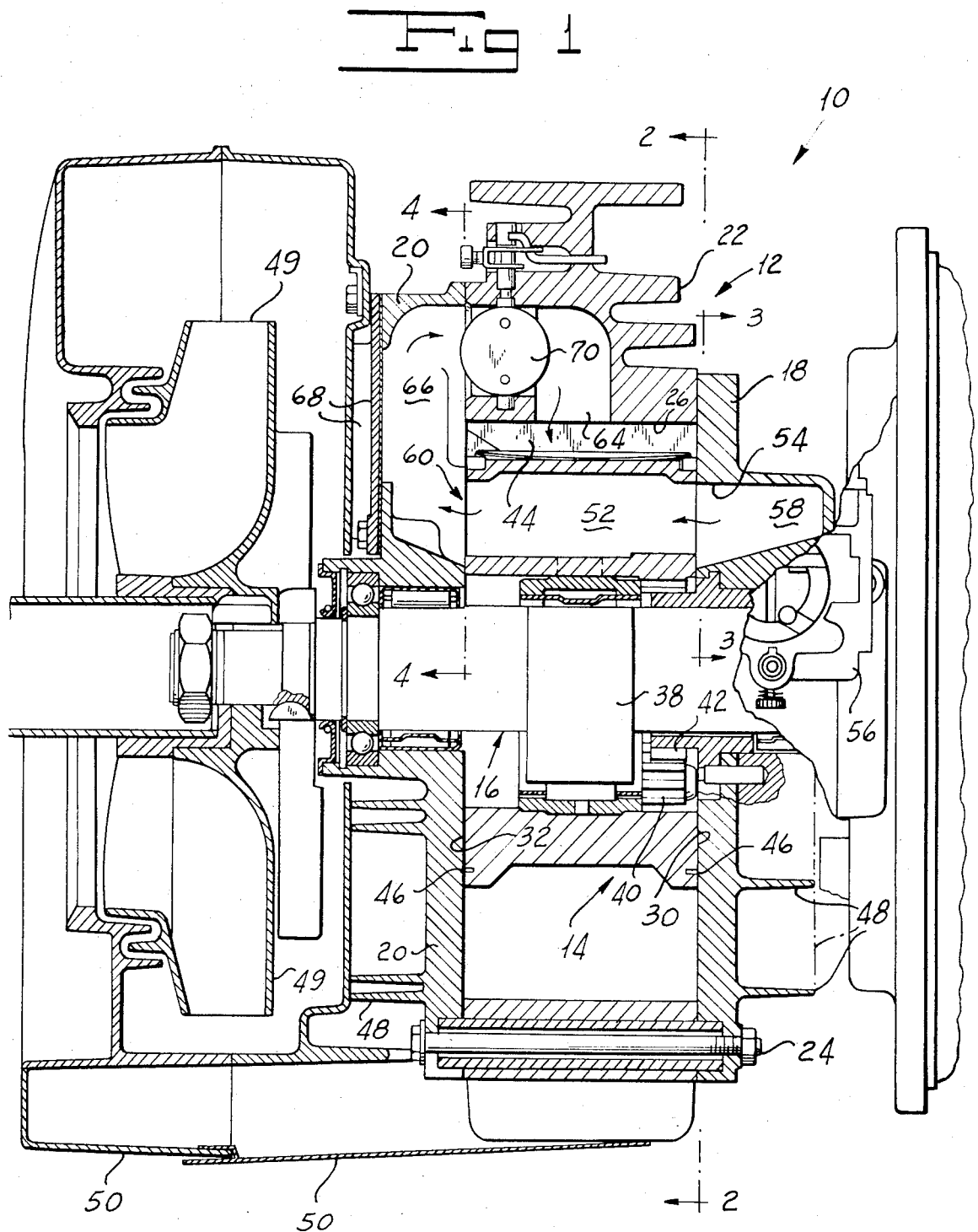
FIG. 1 is a longitudinal cross-sectional view of the rotary internal combustion engine according to this invention.
Figure 2:
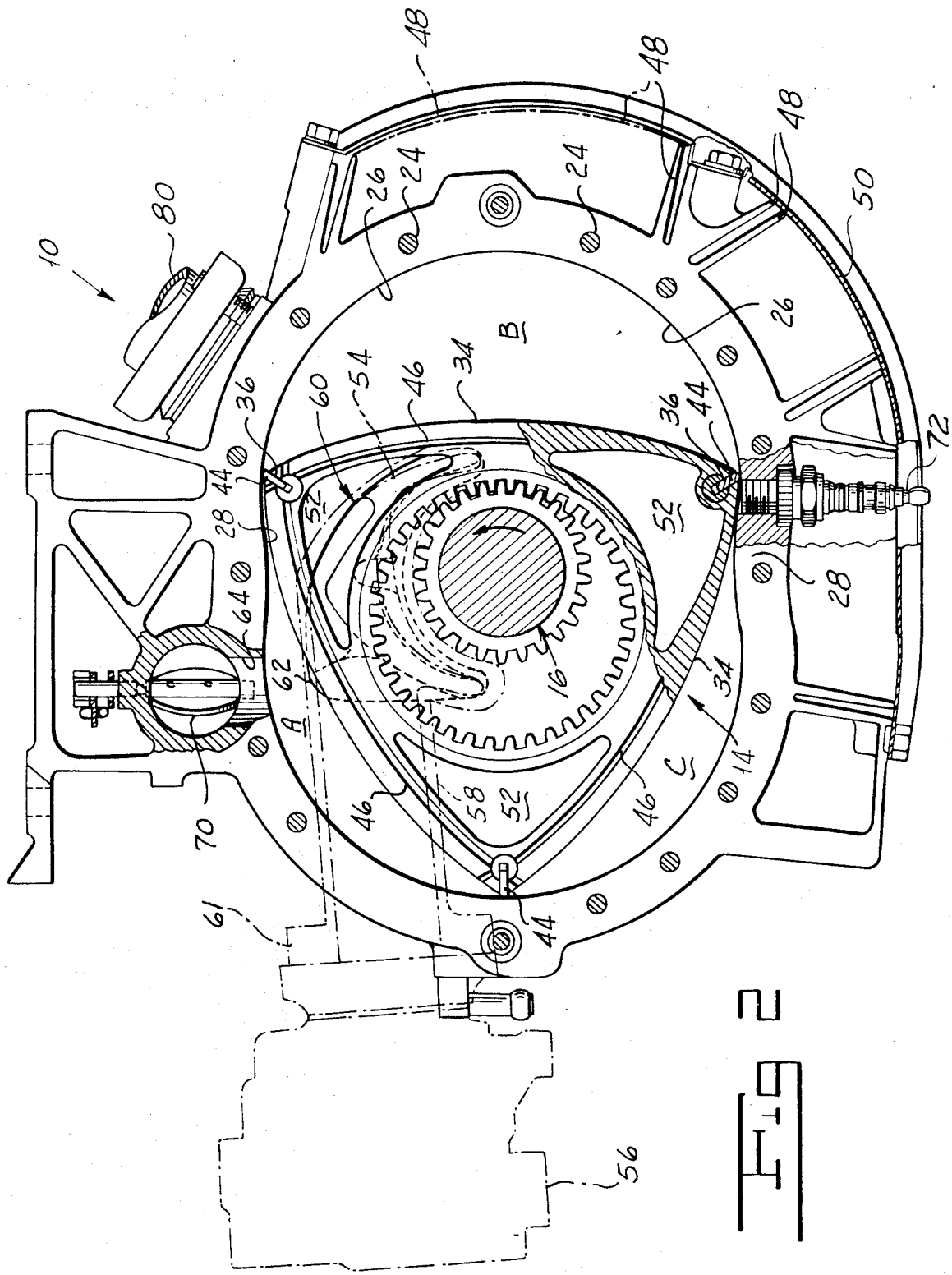
FIG. 2 is a transverse view in cross-section taken substantially along line 2—2 of FIG. 1.

Now referring to the drawings and, more particularly, to FIGS. 1 and 2, wherein the rotary internal combustion engine of the Wankel type, such as disclosed in the U.S. Pat. to Wankel et al., No. 2,988,065 is generally designated by the reference numeral 10. The rotary internal combustion engine 10 essentially comprises a housing 12 within which a rotor 14 is supported by an output shaft 16 for eccentric rotation.

The housing 12 comprises two side walls 18 and 20 which are held in spaced relationship by a peripheral wall 22. The side walls and peripheral wall 22 are secured together by tie bolts 24 to form therebetween a cavity within which rotor 14 rotates. The peripheral wall 22 has a trochoidal inner surface 26. As best shown in FIG. 2, inner surface 26 has a multi-lobe profile which preferably is an epitrochoid and for illustration purposes, the inner surface has two lobes which meet at lobe junctions 28.

The rotor 14 comprises a body having two axially spaced end faces 30 and 32 and a peripheral surface consisting of a plurality of flank portions 34, the next adjacent flank portions meeting at an apex portion 36. The flank portions number one more than the number of lobes in the inner trochoidal surface 26 and, therefore, rotor 14 is shown herein as having three flank portions 34 since a two-lobe housing cavity is illustrated. The rotor 14 is supported within the housing cavity on an eccentric portion 38 of output shaft 16. To maintain the rotor in the proper angular relationship to the housing and shaft, the rotor has an internal ring gear 40 which meshes with a pinion gear 42 secured to housing end wall 18. The flank portions 34 define with trochoidal surface 26 of housing 12 a plurality of working chambers A, B and C which, upon rotation of rotor 18, successively increase and decrease in volumetric size and, therefore, each working chamber undergoes a suction, compression, expansion and exhaust cycle of operation. To maintain the working chambers A, B and C out of communication with each other, apex seals 44 are carried in each apex 36 of rotor 14 to abut the inner surface 26 and gas seals 46 are carried in each of the opposite end faces 30 and 32 to engage the adjacent housing end walls 18 and 20.

As best shown in FIG. 2, housing 12 is air cooled and to this end side walls 18 and 20 are provided with fins 48, a blower or fan 49 connected so as to be rotated by output shaft 16, and sheathing means 50 for guiding and directing air discharged from fan 49 over and between fins 48.

In accordance with the present invention, rotor 14 is cooled by flow of a fuel and air mixture therethrough and, therefore, the rotor 14 constitutes a "charge-cooled" rotor. To provide for flow of fuel and air through the rotor, rotor 14 has, adjacent each apex portion 36, cooling passageways 52 which extend axially between opposite end faces 30 and 32 of the rotor.

To provide for delivery of the fuel and air mixture required for providing combustion in working chambers A, B and C, end wall 18 of the housing has a supply port 54 which is so located and dimensioned that it registers with each of the cooling passageways 52 of the rotor as the latter rotates. In FIG. 2, supply port 54 is shown in phantom lines (dot-dash lines) while, in FIG. 3, the supply port 54 is shown in full lines. The supply port 54 communicates with a source of fuel and air, such as a carburetor 56, via a conduit 58 which is formed in side wall 18 and is connected at 61 to the carburetor to receive the fuel and air mixture. The supply port 54 is located such that it is always completely radially, inwardly of the inner evelope curve traced by gas seals 46 as rotor 14 rotates within the housing cavity. This arrangement, of course, prevents communication of supply port 54 with working chambers A, B and C and bypass of fuel and air directly into those chambers.

As best illustrated in FIGS. 1, 4 and 5, a combination intake and transition port 60 is provided in housing end wall 22 to receive the fuel-air mixture from cooling passageways 52 and pass the same to the working chambers when the latter are in the suction, induction or intake cycle of operation (hereinafter referred to as the "induction chamber"). The intake and transition port 60 is located in substantial alignment with supply port 54 and is so located and sized that a portion of port 60 is always completely within the inner envelope curve traced by gas seals 56 as rotor 14 rotates within the housing cavity. This portion of port 60 constitutes the transition portion of the port, while the remaining portion of the port, which is radially outwardly of the inner envelope curve scribed by the gas seals, functions as a side intake port 62 (see FIG. 4). The flow of fuel and air through side intake port 62 into the induction chamber is controlled by the geometry and speed of rotation of rotor 16.

In order that the engine 10 have the benefits of the introduction of fuel and air into the induction chamber peripherally as well as through side wall intake port 62, the engine is provided with a peripheral intake port 64 located in peripheral housing wall 22. The peripheral intake port 64 is in communication with the transition-intake port 60, via a distribution conduit 66 which extends radially outwardly in housing side wall 20 and in an axial direction in peripheral wall 22. As best shown in FIGS. 1 and 5, distribution conduit 66 is partly defined by a cover 68 secured to side wall 20. For purposes of controlling flow of fuel and air through peripheral intake port 64, a valve means, such as a throttle plate 70, is disposed in distribution conduit 66 and pivotally secured in peripheral wall 22. To achieve the advantages of both side and peripheral intake porting, the throttle plate 70 is in a position to close-off flow of fuel and air through peripheral intake port 64 during the certain phases of engine operation, such as idling and deceleration, and is progressively opened as the engine operating conditions change, such as increased speed or load. Any suitable means for automatically actuating throttle valve 70 relative to the engine speed or load conditions can be achieved by any suitable means well known to those skilled in the art. For example, through suitable linkage (not shown), throttle valve may be connected to the carburetor throttle valve actuating mechanism (not shown) so that the throttle valve 70 is moved simultaneously with the carburetor throttle valve (not shown) between their open or closed positions.

To effect ignition of the fuel and air mixture after its passage into and compression in working chambers A, B and C, a spark plug 72 is provided in peripheral wall 22 (see FIG. 2). The spark plug 72 forms part of any conventional ignition system well known to those skilled in the internal combustion engine field. An exhaust means, including an exhaust port (not shown) and an exhaust duct 80 are provided in peripheral wall 22 to receive and conduct spent products of combustion from the working chambers A, B and C when they are in their exhaust cycle of operation.

Although, the invention has been described as applicable to an air-cooled engine, it is to be understood that the invention is not to be limited to such engine and may be applied as well to liquid cooled engines. Also included in the scope of the invention are diesel engines and engines having rotating housings and stationary rotors or where both housing and rotor rotate.

OPERATION

In operation of engine 10, for the certain idling phase of operations, such as idling, throttle valve 70 is in the closed position so that no fuel and air passes, through peripheral intake port 64, into the induction chambers. As clearly illustrated in FIG. 5, the fuel-air mixture from carburetor 56 (FIG. 2) passes to supply port 54 via supply conduit 58. From supply port 54, all of the fuel-air mixture flows through cooling passageways 52 each time a passageway comes into registry with supply port 54 and intake-transition port 60. Of course, the ports 54 and 60 are so located relative to the angular position of rotor 14 that registry occurs when intake port 62 and peripheral port 64 are open to the induction chamber. In flowing through cooling passageways 52, the fuel-air mixture removes heat from the rotor and is heated thereby. From intake-transition port 60, all of the fuel-air mixture flows into the induction chamber through the side intake port 62 of intake-transition port 60 since throttle valve 70 is closed. In an idling phase of engine operation, entry of all of the fuel-air mixture into the induction chamber, through side intake port 62, provides the engine with stable and smooth operation. As the engine speed is changed and as side intake port 62 becomes less able to provide the necessary amount of fuel-air mixture for efficient, high power engine operation, throttle valve 70 is opened to permit entry of fuel-air mixture into the induction chamber, in addition to the fuel and air delivered to the induction chamber through side intake port 62. This supplemental flow of fuel and air, via distribution conduit 66, to peripheral intake port 64, increases with increased opening of throttle valve 70. With the increased flow of fuel-air mixture through peripheral intake port 64, there is no sacrifice of rotor cooling since the entire fuel-air charge is always directed through cooling passageways 52 of rotor 14. Also, the engine, from idle through high speed operation, always receives the required amount of fuel and air for stable high power operation by reason of the controlled distribution of fuel and air to both the side intake port 62 and peripheral intake port 64.

It is now believed readily apparent that the present invention provides an improved rotary internal combustion engine which combines charge-cooling of the rotor with side and peripheral intake ports whereby effective cooling of the rotor is achieved particularly when most needed at high speeds or loads together with stable smooth engine performance from idling through full speed operation of the engine.

Although but one embodiment of this invention has been illustrated and described in detail, it is to be expressly understood that the invention is not limited thereto. For example, additional cooling passageways can be provided in the eccentric portion 38 of shaft 16 so that a portion of the fuel-air mixture effects a cooling of the rotor and rotor bearings such as disclosed in the printed paper of the Society of Automotive Engineers entitled, A Survey of Curtiss-Wright's 1958 — 1971 Rotating Combustion Engine Technological Developments, prepared by C. Jones, U.S. Pat. No. 720,468 May 1972, and in the U.S. Pat. to Paschke, No. 3,180,323. Various other changes can be made in the arrangement of parts without departing from the scope and spirit of the invention as the same will now be understood by those skilled in the art.

What is claimed is:

1. In a rotary internal combustion engine having side walls spaced apart by a peripheral wall to define therebetween a housing cavity within which a rotor is supported for eccentric rotation, the rotor defining with the housing cavity a plurality of working chambers which successively vary in volumetric dimensions as the rotor rotates and having axially extending passageway means extending therethrough, the combination of
 a. a supply port means disposed in one of said side walls so that as the rotor rotates it registers with the passageway means in said rotor,
 b. conduit means for communicating said supply port with a source of combustible fluid,
 c. a side port means disposed in the other side wall so that as the rotor rotates it registers with the passageway means in said rotor to thereby receive combustible fluid from the latter,
 d. said side port means, including side intake port means, communicating with said working chambers to pass combustible fluid into the latter,
 e. a peripheral intake port means in said peripheral wall communicating with said port means to receive from the latter a portion of said combustible fluid, and
 f. control means for proportioning flow of combustible fluid to said peripheral intake port means and said side intake port means.

2. The apparatus of claim 1 wherein said control means is a valve which regulates flow of combustible fluid through the peripheral intake port means.

3. The apparatus of claim 1 wherein said side port means, in addition to said side intake port means, includes a transition port means which is always out of communication with the working chambers and registers with the passageway means in the rotor as the latter rotates.

4. The apparatus of claim 3 wherein a distribution conduit means communicates the transition port means with said peripheral intake port means.

5. The apparatus of claim 2 wherein actuating means is provided for closing said valve during idling or deceleration of operation of the engine and for progressively opening the valve as the speed or load on the engine increases.

6. The apparatus of claim 1 wherein said passageway means in the rotor includes a plurality of axially extending passageways.

7. In a rotary internal combustion engine comprising side walls spaced apart by a peripheral wall having a trochoidal inner surface so as to define therebetweeen a multi-lobed cavity and a rotor, having a plurality of circumferentially spaced apex portions, and opposite end faces, supported for eccentric rotation in said cavity, the rotor defining with the trochoidal inner surface and the side walls a plurality of working chambers which successively vary in volumetric size as the rotor rotates and pass through suction, compression expansion and exhaust cycles of operation, the combination comprising
 a. a plurality of cooling passageways extending axially through the rotor from one rotor end face to the other;
 b. a supply port disposed in one of said side walls and in communication with a source of combustible fluid;
 c. said supply port being of such size and location that it intermittently comes into registry with each of said plurality of cooling passageways to pass combustible fluid into the latter;
 d. an intake-transition port in the other side wall disposed so that a first portion of the port intermittently registers with each of said plurality of cooling passageways to receive from the latter heated combustible fluid;
 d. a second portion of said intake-transition port being located relative to said rotor that the rotor allows communication of said second port portion with the working chambers when the latter are in the suction phase of operation and thereby provide for passage of combustible fluid into the working chambers,
 f. a peripheral intake port in said peripheral wall communicating with said first port portion of the intake-transition port to receive a portion of the combustible fluid from the latter;
 g. ignition means for igniting the combustible fluid after it passes into the working chambers and is substantially compressed by the compression cycle of operation of the working chambers;
 h. exhaust port means communicating with the working chambers during their exhaust cycle of operation so as to expel burnt combustible fluid from the working chambers; and,
 i. control means adjacent said peripheral intake port to regulate flow of combustible fluid to the peripheral intake port.

8. The apparatus of claim 7 wherein said peripheral intake port is in communication with the first port portion of the intake-transition port via a distribution conduit and wherein said control means is a valve disposed in said distribution conduit.

9. The apparatus of claim 8 wherein said valve is connected to actuating means for closing the valve during engine idling or deceleration and for opening the valve to its full open position gradually as engine speed or load increases.

10. The apparatus of claim 7 wherein said first portion of the intake-transition port is always out of communication with the working chambers.

* * * * *

UNITED STATES PATENT OFFICE
CERTIFICATE OF CORRECTION

Patent No. 3,779,214          Dated Dec. 18, 1973

Inventor(s) Harry M. Ward, III and Eugene R. Hackbarth

It is certified that error appears in the above-identified patent and that said Letters Patent are hereby corrected as shown below:

IN THE SPECIFICATION:

Column 6, line 58, after the name "Jones", delete the words --U.S. Pat.--.

IN THE CLAIMS:

Column 7, line 19, after the word "said" insert the word --side--.

Column 8, line 18, the letter "d." should read --e.--

Signed and sealed this 23rd day of April 1974.

(SEAL)
Attest:

EDWARD M. FLETCHER, JR.
Attesting Officer

C. MARSHALL DANN
Commissioner of Patents